Feb. 14, 1956 L. BROOKS 2,734,800
GRAPHITE PURIFICATION
Filed Nov. 16, 1949

INVENTOR.
Lynn Brooks
BY
Roland A. Anderson
ATTORNEY

United States Patent Office 2,734,800
Patented Feb. 14, 1956

2,734,800
GRAPHITE PURIFICATION

Lynn Brooks, Bay City, Mich., assignor to United Carbon Products Co., Inc., Bay City, Mich.

Application November 16, 1949, Serial No. 127,594

8 Claims. (Cl. 23—209.9)

This invention relates to a method of removing impurities from graphite and more particularly to a method for removing impurities from graphite articles as volatile reaction products.

This application is a continuation-in-part of application No. 750,599, filed May 26, 1947.

Many attempts have been made in the past to purify graphite. These methods were successful in so far as they produced a graphite of sufficient purity to satisfy the requirements then established.

However, certain of today's arts require a graphite of a purity never contemplated in the past. In the arc spectograph, for example, analyses are carried out for the detection of impurities present in amounts as low as a few hundredths of a part per million. The graphite electrodes used as the arc source in such an analysis must be of a correspondingly high purity as not to mask the spectrum of the sample. Another use today of high purity graphite is in nuclear reactors wherein it is used as a neutron moderating agent. Since certain elements display an avid ability to "capture," i. e., to absorb neutrons, thereby reducing the number available for sustenance of the chain reaction, it is desirable that the graphite be exceptionally free of such substances. It has not been found possible to obtain a graphite of sufficient purity for these purposes by the prior processes due to certain inherent faults in these processes.

This invention has as an object a method of obtaining graphite of high purity. A further object is a method for treating graphite articles to remove impurities therefrom without structural damage to the article. Other objects will appear hereinafter.

Broadly these objects are accomplished by first subjecting the graphite to be purified at an elevated temperature to the action of a chlorinating agent thus removing certain impurities as volatile chlorides and subsequent to this treatment subjecting the graphite at a more elevated temperature to the action of a fluorinating agent, which causes further purification by removing certain impurities as volatile fluorides.

Figure 1:
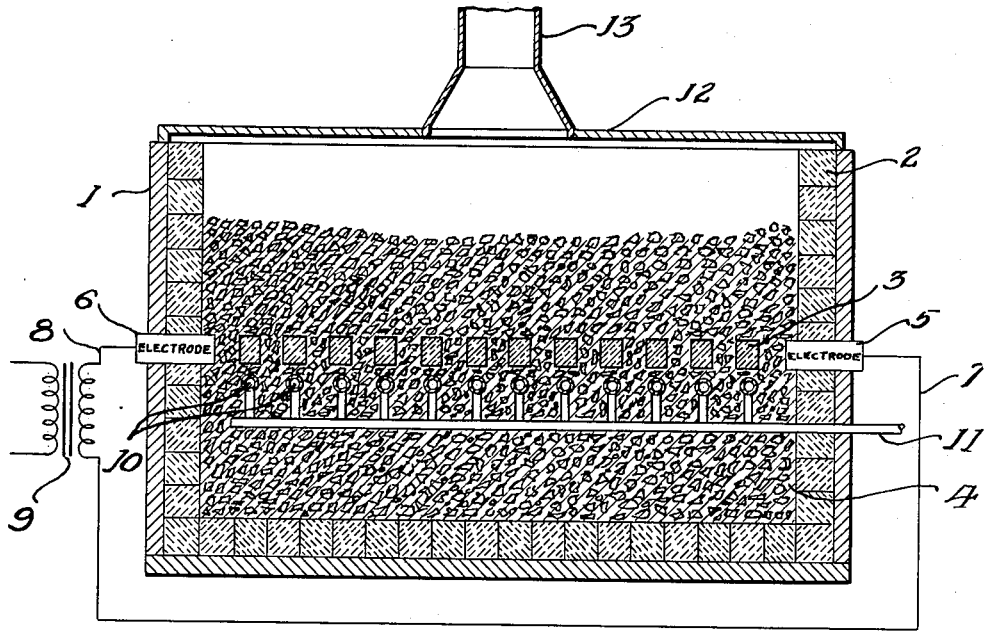
Figure 2:
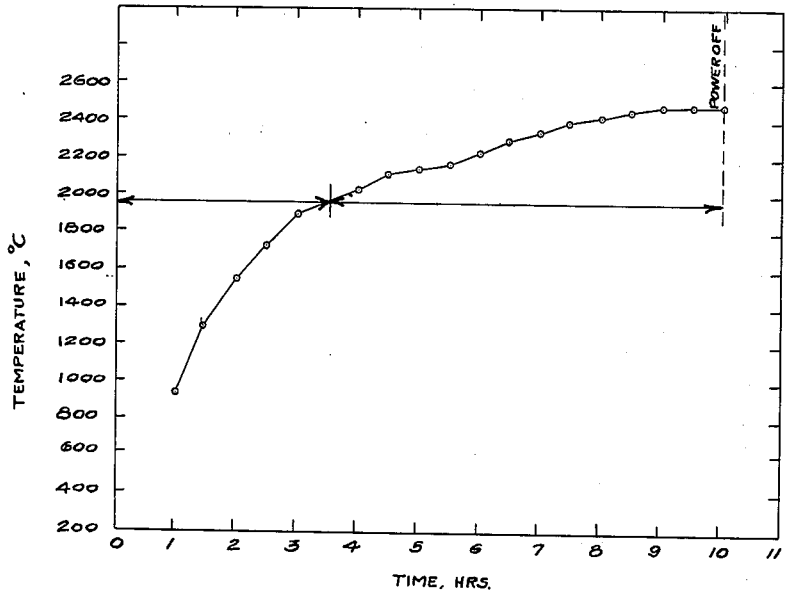

The invention is more fully described in the description of the process below and the accompanying figures, of which:

Figure 1 is a semi-diagrammatic view in sectional elevation of a suitable apparatus for carrying out the process of this invention; and Figure 2 is a graphic outline of the process.

Figure 1 represents an arrangement for carrying out the process of the invention in a granular carbon resistance type furnace. The steel shell 1 of the furnace is lined with fire brick 2. The graphite articles 3 to be purified are placed in a pure petroleum coke bed 4 and are spaced evenly between the graphite furnace electrodes 5, 6 which extend through the walls of the furnace. The electrodes are connected through leads 7, 8 to a suitable source of current represented here by transformer 9. Porous tubes 10 of a suitable material, such as graphite are mounted in the coke bed 4 beneath graphite articles 3 for the purpose of introducing the reactants to the graphite articles. The reactants are introduced to the furnace and distributed to porous tubes 10 by means of header pipe 11. Hood 12 and duct 13 serve to remove the gaseous reaction products and excess reactants. Heating of the furnace is accomplished by the resistance of the graphite articles 3 and the coke bed 4 to an electric current applied between electrodes 5, 6. The distribution of the heating within the furnace and the temperature are controlled by selection of the size of the particles of the coke bed 4 and the amount of current applied to the electrodes 5, 6.

The temperature of the furnace may be determined by the usual thermocouple or optical pyrometer methods. It is to be understood that the furnace described above is only by way of example and that the process of the present invention can be carried out in other types of furnaces.

The following example of the practice of the present invention was carried out in a furnace such as described above. 874 lbs. of impure graphite in the form of thirty bars each 26½" x 4⅜" x 4¼" made up the charge. These bars were of synthetic graphite having a specific gravity of about 1.65 prepared by graphitizing bars of petroleum coke powder bonded with coal tar pitch. These bars were loaded in a graphite resistor furnace in the manner taught above. The procedure from this point is graphically outlined in Figure 2. The heating of the furnace was started by applying current to the furnace electrodes. As can be seen from Figure 2 when the temperature of the furnace is approximately 950° C. $CCl_4$ vapor carried in nitrogen gas was passed into the furnace. The introduction of $CCl_4$ by means of header pipe 11 and porous tubes 10, was continued at an even rate until the charge attained a temperature of 1950° C. This took 2½ hours during which period a total of 63 lbs. of $CCl_4$ carried in 100 cu. ft. of nitrogen gas was passed into the furnace. When the temperature of the charge reached 1950° C. the introduction of $CCl_4$ was stopped and the introduction of difluoro-dichloromethane, "Freon-12," was started through header pipe 11 and porous tubes 10. Heating was continued for a period of six and one-half hours until the charge temperature reached approximately 2500° C. The "Freon-12" was introduced at a steady rate during this period, the total amount being 61 lbs. At this point the heating was stopped, the "Freon-12" replaced with nitrogen gas, and the furnace allowed to cool.

An analysis of the impure graphite introduced to the furnace indicated a total ash content of 600 parts per million and an initial boron content of 0.60 part per million. By employing the process described above, the ash content was reduced to approximately 10 parts per million and the boron content was reduced to 0.02 part per million.

In place of the $CCl_4$ chlorine gas may be used or any fully chlorinated hydrocarbon, such as hexachloropropylene which will dissociate to give free chlorine at a temperature below about 900° C. may be used.

As alternative fluorinating agents $C_2F_4$, $CF_4$ and other fully halogenated hydrocarbons containing fluorine which dissociate to release free fluorine at a temperature below about 1800° C. are also satisfactory. Fluorine itself or HF may also be used but are undesirable in view of their corrosive effect upon the apparatus.

It has been found desirable to continue the chlorination until the graphite has attained a temperature of about 1860° C. It was found that if the chlorination was not continued to this temperature that certain contaminants, such as, calcium and magnesium were not completely removed as their chlorides. Since their fluorides are less volatile, it was found difficult to remove those portions remaining during the fluorination step. If the chlorination was continued to a temperature of about 1860° C., it was found that this difficulty was obviated since these impurities were apparently substantially completely removed during the chlorination step. Though the fluorination might be started at a lower temperature than the 1860° C. attained during the chlorination step, it has been found desirable to maintain that temperature while replacing the chlorinating agent with the fluorinating agent and continue heating the graphite to a higher temperature. This is so for two reasons. First, higher temperatures aid in the removal of those impurities removed as fluorides; and, second, the higher temperatures, that is, greater than 1860° C., obviate the possibility of the graphite articles eroding and disintegrating. Carbon reacts rather vigorously with fluorine at ordinary temperatures to form volatile products; at higher temperatures, however, these products dissociate. Therefore, if the fluorinating agent is not introduced except above the dissociation temperature of the carbon and fluorine reaction products, no reaction of the fluorine with the graphite will occur. It is convenient from the standpoint of operating procedure to merely replace the chlorinating agent with the fluorinating agent when the temperature of 1860° C. is attained, and continue the heating from that point, but further no erosion of the graphite articles was observed when the process was carried out in this manner. Thus the process of the invention affords a means for treating graphite articles to remove impurities therefrom without destroying the conformation of the articles.

The fluorination step was found absolutely necessary to attain the removal of boron. Several attempts were made to use chlorinating agents alone up to temperatures even greater than 2800° C. In none of these attempts was it found possible to lower the boron content to even as low as 0.10 part per million.

Though maximum fluorination temperatures as low as 2100° C. or 2200° C. resulted in substantial removal of the boron, it was found desirable to heat the graphite to a temperature of about 2400° C. or higher while the fluorinating agent was introduced.

Sweeping the furnace during the cooling period with nitrogen or helium was found to result in more complete elimination of any chlorine or fluorine that might remain in the graphite bars. In this regard helium is to be preferred where graphite is being purified for use as a neutron moderator since helium has a lower neutron capture cross section than nitrogen and the residual gas remaining in the graphite will be less deleterious.

An alternative carrying gas for the chlorinating agents is anhydrous ammonia gas. This is, of course, cheaper and more readily available than nitrogen. For chlorinating agents, such as chlorine, which are gaseous at normal temperatures it is not necessary to use a carrying agent.

The process of the invention also gave unexpected results in removing impurities heretofore not even suspected of being in the graphite. During the development of the process several purified and unpurified graphite bars were tested for impurity content by subjecting them to neutron bombardment and determining the neutron adsorption factors of the bars. It was found that the neutron adsorption of the purified bars was considerably less than could be accounted for by the removal of the known impurities. It was evident that some hitherto unrecognized impurities were present in the unpurified graphite and were removed by this purification process. Radiochemical analyses finally revealed that the process caused the removal of certain rare earths present in the impure graphite in very minute amounts. Some of these rare earths have a very large neutron capture cross section.

The removal of the impurities obtained by the process of this invention is extremely desirable when the graphite is to be used as a moderator in a neutronic reactor. The utilization of such highly purified graphite increases the number of neutrons available for maintaining the chain reaction and thus increases the neutron efficiency of a reactor. This, of course, makes possible the greater overall efficiency of the reactor and also makes possible a considerable saving in the investment of fissionable material required to sustain a chain reaction.

Another advantage of the process resides in the ability to purify preshaped graphite articles without causing the erosion and disintegration thereof. Graphite bars of high density can be cheaply made from crude petroleum coke and coal tar pitch as described in the example. By using the method of the present invention such bars can be easily purified to a very high purity without lowering the density thereof. It is, of course, desirable to have as dense a graphite as possible when the graphite is to be used as a neutron moderator.

The process of this invention though described in its application to the purification of graphite is not limited thereto. The process can also be used for purifying ungraphitized carbon. For example the petroleum coke and coal tar pitch bars, such as were graphitized to form the graphite bars purified in the example could be treated by this process. Thus it is to be understood the foregoing invention is to be taken as illustrative rather than limiting in scope, the invention being limited only as is necessitated by the prior art and the scope of the appended claims.

What is claimed is:

1. A process for purifying graphite which comprises the steps of subjecting the impure graphite at elevated temperatures and up to at least 1860° C. to the action of a chlorinating agent selected from the group consisting of chlorine and fully chlorinated hydrocarbons, and subsequently, at a temperature greater than the temperature range within which carbon and fluorine will react, subjecting the graphite to the action of a fluorinating agent selected from the group consisting of fluorine, hydrogen fluoride and fully halogenated hydrocarbons of which at least one of the halogens is fluorine.

2. A process for purifying graphite which comprises the steps of treating impure graphite with a chlorinating agent selected from the group consisting of chlorine and fully chlorinated hydrocarbons at elevated temperatures and up to at least 1860° C. and subsequently treating the graphite with a fluorinating agent selected from the group consisting of fluorine, hydrogen fluoride and fully halogenated hydrocarbons of which at least one of the halogens is fluorine at a temperature greater than 1860° C.

3. A process for purifying graphite which comprises the steps of slowly heating the impure graphite to a temperature of about 1860° C., maintaining said impure graphite during said heating period in an atmosphere of a chlorinating agent selected from the group consisting of chlorine and fully chlorinated hydrocarbons, replacing, when aforesaid temperature of 1860° C. is attained, said chlorinating agent with a fluorinating agent selected from the group consisting of fluorine, hydrogen fluoride and fully halogenated hydrocarbons of which at least one of the halogens is fluorine, continuing said heating and maintaining the atmosphere of said fluorinating agent until the graphite attains a temperature of greater than 2100° C., discontinuing the heating, replacing the fluorinating agent with a non-reactive gas and allowing the purified graphite to cool.

4. The process of claim 3 wherein the chlorinating agent is carbon tetrachloride and the fluorinating agent is dichloro-difluoromethane.

5. The process of claim 3 wherein the chlorinating agent is chlorine and the fluorinating agent is dichloro-difluoromethane.

6. The process of claim 3 wherein the chlorinating agent is carbon tetrachloride and the fluorinating agent is carbon tetrafluoride.

7. The process of claim 3 wherein the chlorinating agent is chlorine and the fluorinating agent is carbon tetrafluoride.

8. A process for purifying graphite which comprises the steps of subjecting the impure graphite at an elevated temperature to the action of a chlorinating agent selected from the class consisting of chlorine and fully chlorinated hydrocarbons and subsequently subjecting the graphite at an elevated temperature of at least 1860° C. to the action of a fluorinating agent selected from the group consisting of fluorine, hydrogen fluoride and fully halogenated hydrocarbons of which at least one of the halogens is fluorine.

No references cited.